Patented June 12, 1928.

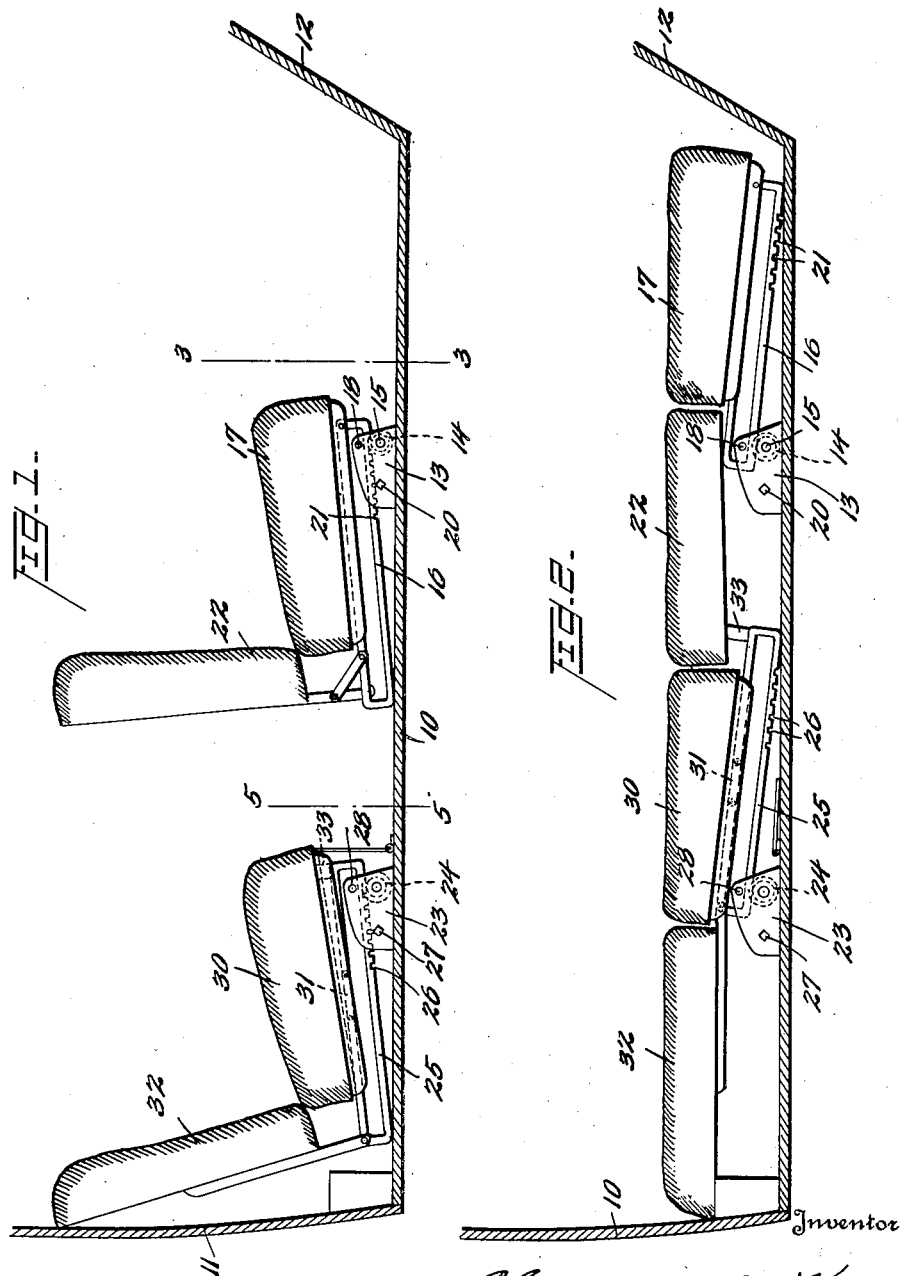

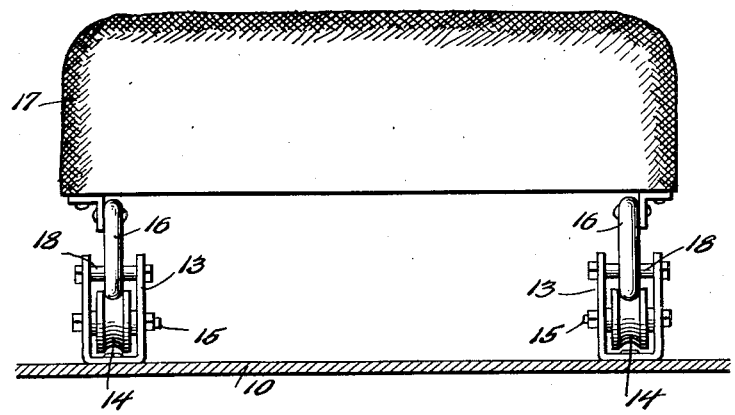
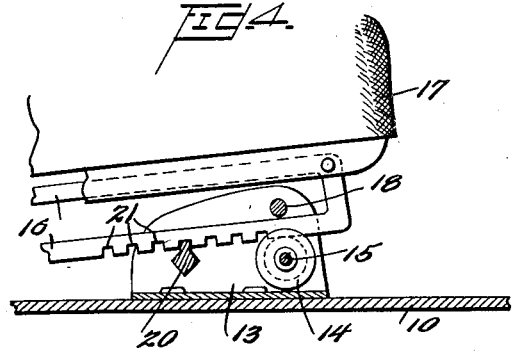
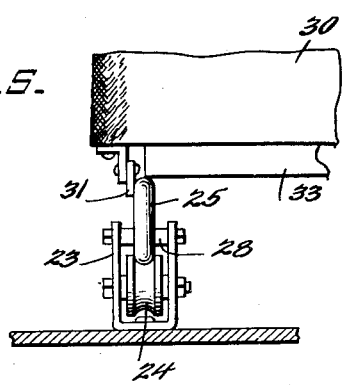

1,673,257

UNITED STATES PATENT OFFICE.

CLARENCE A. McKENNA, OF FLINT, MICHIGAN.

SEAT AND BED ARRANGEMENT FOR AUTOMOBILES.

Application filed October 7, 1927. Serial No. 224,729.

This invention relates to seats for automobiles and particularly to a construction for supporting the seats which permits the same to be adjusted rearwardly to any desired extent and locked in position and which also permits the seats to be moved forwardly and the backs thereof turned down so that the seats and the backs thereof combine to form a bed in the automobile.

This application is a continuation in part of my co-pending application, Serial No. 154,396, filed December 13, 1926, the present application being directed specifically to the rear seat construction, although there is disclosed and claimed certain features applicable to either the front or the rear seat arrangement.

The object of the invention is to provide seats for an automobile or other vehicle which can be moved rearwardly and firmly locked in position for ordinary use as seats and which at the same time can be easily moved in position to form a bed. A further object is to provide a rear seat having a back hingedly connected thereto and a seat proper which can be moved rearwardly to abut said back and which rear seat, when so moved, will expose supporting means upon which the rear end of the back of the front seat may rest when turned into a horizontal position. A still further object is to provide a construction in which the seats can be readily manipulated so as to arrange the same in position to form a bed.

Other objects and advantages of the arrangement will be apparent from the following specification taken in connection with the accompanying drawings, it being obvious that various modifications in details of the structure may be resorted to.

In said drawings

Fig. 1 is a longitudinal section of an automobile body having my improved arrangement applied thereto, the seats being shown in elevation;

Fig. 2 is a view similar to Fig. 1, showing the seats and the backs thereof arranged to form a bed;

Fig. 3 is a transverse section substantially on the line 3—3 of Fig. 1;

Fig. 4 is a detailed view showing the improved means employed for locking the seats when the same are moved to their rearward position; and Fig. 5 is a partial transverse section substantially on the line 5—5 of Fig. 1, showing the front of the rear seat and the means for supporting the same.

Referring to the drawings in detail by the reference characters thereon, the numeral 10 indicates the floor of the automobile in which my improved construction is arranged. The numeral 11 indicates the back of the body, and 12, the usual footboard at the front thereof. The arrangement used for supporting the front seat and the rear seat is substantially the same except as to certain details. This arrangement will first be briefly described in reference to the front seat.

A pair of supports 13 are secured in the automobile body, preferably being attached to the floor thereof, one of these supports being arranged on each side. These supports may be made in any suitable manner but preferably comprise U shaped plates having their intermediate portions secured to the floor and the arms thereof extending upwardly and spaced apart. A roller 14 is mounted in each of the supports, preferably by means of bolts 15 which pass through the upwardly extending arms of the supports. The rollers 14 are peripherally grooved and are adapted to support rails 16 which in turn are secured to the front seat 17. The seat 17 is, of course, provided with the usual cushions and is secured to the rails 16 in any suitable manner. The rails 16 are preferably slotted longitudinally, and a transverse rod or bolt 18 serves to prevent the same from being lifted from the rollers 14.

It will be understood that the rails 16 are shaped to fit the grooved peripheries of the rollers 14, and with the parts arranged as described, it will be seen that the rails 16 and the seat 17 carried thereby can be raised and slid forwardly or rearwardly, relative to the supports 13. In other words, the rails are slidably and pivotally associated with the supports 13 so that the rails and the seat supported thereon may be adjusted to any position desired.

In order that the seat may be held in any desired position of adjustment, locking means are provided between the rails 16 and the supports 13. The supports 13 are provided with transverse locking members 20 which, at their upper edges, are provided with narrow portions or corners which are adapted to enter notches 21 provided in the lower edge of the rails 16. From this it will be seen that the rails 16 can be moved rearwardly to any desired extent and then the rear ends thereof lowered until the notches 21 engage the locking members 20, which serves to lock the rail in any desired position. When the rails are substantially horizontal, they can be moved back and forth over the supports to any desired extent. That is, they can be moved forwardly to the position shown in Fig. 2 or rearwardly to the position shown in Fig. 1. When moved to their rearward position and the rear ends depressed, the rails will be locked to the supports.

The back 22 of the front seat is hingedly connected to the rails 16, but the details of such connection are shown and claimed in my said co-pending application, and further reference to the same is unnecessary here.

Referring to the rear seat construction, 23 indicates the supports therefor, which are constructed and arranged substantially the same as the supports 13 for the front seat. That is, these supports are provided with rollers 24 over which the rails 25 are adapted to be moved in either direction and which are provided on their under side with notches 26 adapted to engage locking members 27 carried by the supports 23, so that when the rails 25 are moved rearwardly and the rear ends thereof depressed, said rails will be locked to said supports. Also, a transverse bolt 28 serves to prevent disengagement of the rails 25 from the rollers 24.

Mounted upon the rails 25 is a seat 30 which is movably connected to the rails 25 by means of short links 31. The rear seat 30 is provided with a back 32 which is hingedly connected to the rails 25 and which may be turned down into horizontal position as shown in Fig. 2.

By means of the movable connection between the rails 25 and the seat 30 afforded by the links 31, the seat 30 can be moved rearwardly relative to the rails 25. That is, the rails 25 may be moved into the position shown in Fig. 2, the back 32 of the seat turned downwardly and the seat 30 moved rearwardly to abut the front edge of the back 32.

It will be evident that when the seat 30 is moved rearwardly to the position shown in Fig. 2, the front ends of the rails 25 will be exposed and secured to said rails, and extending transversely between the same is a rod or bar 33, and this bar serves as a support for another section of the bed, or in other words, serves as a support for the rear end of the back of the front seat when the same is turned into horizontal position.

It will be seen that the foregoing construction provides an arrangement by which either the front or rear seat may be moved rearwardly to any extent desired and locked in the desired position. The rear seat construction also furnishes an arrangement by which the parts of such seat may be easily and readily arranged in position to form part of a bed, the rest of course being formed by the parts of the front seat as more fully set forth and claimed in my co-pending application.

Having thus described the invention, what is claimed as new and desired to be secured by Letters Patent is:

1. In combination with an automobile body, a seat, a pair of rails secured to said seat, one adjacent each end thereof, supports mounted in said body and upon which said rails are adapted to rest, said rails being slidably and pivotally associated with said supports, a rigid locking member carried by each of said supports, said rails having a plurality of notches therein, any one of which is adapted to engage said locking member when said rails are moved rearwardly and their rear ends depressed, whereby said rails may be locked to said supports in any one of a plurality of positions, and a back for said seat hingedly connected to said rails.

2. In combination with an automobile body, a seat, a pair of rails secured thereto, one adjacent each end of the seat, a support for each of said rails mounted in said body, said rails being slidable on said supports and the ends thereof being movable up and down relative to the supports, whereby said rails and the seat may be adjusted to any desired position, a locking member rigidly mounted on each of said supports, each of said rails having a plurality of notches therein, any one of which is adapted to engage the corresponding locking device when the rear ends of the rails are depressed.

3. In combination with an automobile body, a seat, a pair of rails secured to said seat, one on each end thereof, a support for each of said rails mounted on the floor of said body, said rails being slidably and pivotally associated with said supports, said rails normally resting in an inclined position with their front ends supported on said supports and their rear ends engaging said floor, means for locking said rails to said supports in a plurality of positions, said locking means comprising a locking member rigidly carried by each of said supports, and a plurality of notches formed in said rails, each adapted to engage said locking member, when the rear ends of the rails are depressed.

4. A rear seat construction for automobiles adapted to form part of a bed, said construction comprising a pair of supports mounted in the automobile, a pair of rails pivotally and slidably supported on said supports, said supports serving to hold the front ends or rear ends of said rails above the floor of the body with the opposite ends resting upon the floor, a seat carried by said rails and forming one section of a bed, connections between said rails and said seat, whereby the latter may be moved rearwardly relative to said rails to expose the front ends thereof when said rails have been moved forwardly, a back hingedly connected to the rear portion of said rails and movable into a horizontal position to form another section of the bed, the rear end of said seat abutting the front end of said back when the latter is turned down and said seat is moved rearwardly on said rails, means carried by the front ends of said rails for supporting another section of the bed.

5. A construction as specified in claim 4 in which the seat is connected to said rails by means of links.

6. A construction as specified in claim 2 in which said supports are provided with rollers upon which said rails are carried.

In testimony whereof I hereunto affix my signature.

CLARENCE A. McKENNA.